United States Patent [19]

Murata et al.

[11] 4,453,738
[45] Jun. 12, 1984

[54] MOUNTING STRUCTURE FOR UPPER CONTROL ARMS IN A FOUR LINK SUSPENSION SYSTEM

[75] Inventors: Takeo Murata, Toyota; Sadaitsu Tamura; Kozo Mori, both of Aichi, all of Japan

[73] Assignee: Toyota Jidosha Kogyo Kabushiki Kaisha, Aichi, Japan

[21] Appl. No.: 359,106

[22] Filed: Mar. 17, 1982

[30] Foreign Application Priority Data

Jun. 17, 1981 [JP] Japan .................. 56-92113

[51] Int. Cl.³ ............................................. B60G 11/14
[52] U.S. Cl. .................................... 280/725; 180/73.4
[58] Field of Search ............................... 280/725, 713; 180/73 TL; 267/66

[56] References Cited

U.S. PATENT DOCUMENTS

| | | | |
|---|---|---|---|
| 2,692,778 | 10/1954 | Stump | 267/66 |
| 3,333,864 | 8/1967 | Allison | 280/725 |
| 4,334,696 | 6/1982 | Bergström | 280/725 |

FOREIGN PATENT DOCUMENTS

| | | |
|---|---|---|
| 1234542 | 2/1967 | Fed. Rep. of Germany . |
| 2240506 | 3/1976 | Fed. Rep. of Germany ..... 180/73.4 |
| 2151745 | 4/1973 | France . |
| 124315 | 9/1980 | Japan . |
| 529948 | 12/1940 | United Kingdom ................ 280/725 |

*Primary Examiner*—Robert R. Song
*Attorney, Agent, or Firm*—Parkhurst & Oliff

[57] ABSTRACT

A four link suspension system for a monocoque vehicle body, which comprises a pair of upper control arms and a pair of lower control arms adapted to swingably support a rigid axle housing encasing an axle shaft against the body. The body has a floor panel, and a pair of side members spaced from each other in a transverse direction of the body, are provided at both sides of the panel. A cross member is disposed between both side members with a distance from the floor panel and secured at its both ends to the side members. The upper control arms are disposed inside of the lower control arms, and each forward end of the upper control arms is pivoted to said cross member.

9 Claims, 6 Drawing Figures

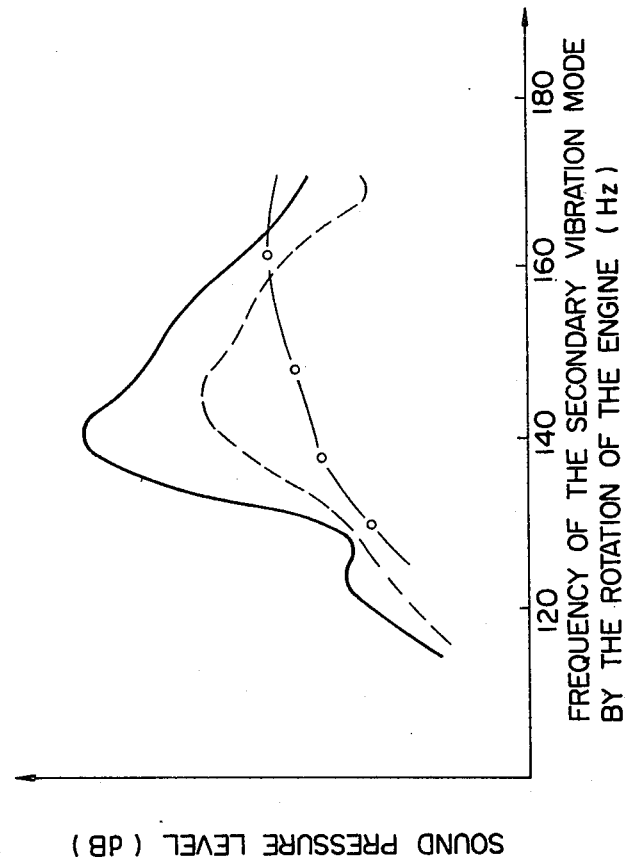

MOUNTING STRUCTURE FOR UPPER CONTROL ARMS IN A FOUR LINK SUSPENSION SYSTEM

BACKGROUND OF THE INVENTION

1. Field of the Invention

The present invention relates to a four link suspension system for motor vehicles, and particularly to a structure for mounting upper control arms of the four link suspension system to a monocoque vehicle body having no frame.

2. Description of the Prior Art

In the four link suspension system, a rigid axle housing encasing an axle shaft for driving wheels, is connected to a vehicle body via a pair of upper control arms and a pair of lower control arms. Each control arm is pivoted at its forward end to the vehicle body and at its rearward end to the axle housing.

In the case of a monocoque body wherein brackets are provided on a floor panel of the body and the forward ends of the respective control arms are pivoted to the respective brackets, vibrations of the axle housing in a longitudinal direction of the body are directly transmitted via each control arm to the floor panel which is most susceptible to vibrations, thus leading to production of an undesirable inside noise of the vehicle.

There has been an attempt to prevent this inside noise by securing to both sides of the floor panel a pair of reinforcing outer side members to support the lower control arms and a pair of reinforcing inner side members to support the upper control arms, and pivotally connecting the forward ends of the respective control arms to the respective side members via brackets.

The lower control arms are disposed outside of the upper control arms, and the rearward ends of the lower control arms are pivoted to the rigid axle housing in the vicinity of the respective ends of the housing. In the vicinity of the ends of the rigid axle housing, no great deflecting vibration force will be exerted. Accordingly, the floor panel will not be vibrated so vigorously as to create an inside noise of the vehicle by the vibrations in a longitudinal direction transmitted from the lower control arms, via the outer side members, to the floor panel to which the outer side members are fixed.

On the other hand, the upper control arms are located inside of the lower control arms and the rearward ends of the upper control arms are pivoted to the axle housing inwards of the end portions to which the lower control arms are pivoted. The deflecting vibration force exerted to the axle housing exhibits a characteristic curve such that it is small at both ends of the axle housing and increases toward the inside. Accordingly, relatively strong vibrations will be transmitted to the foor panel from the rigid axle housing via the upper control arms and the inner side members, whereupon a great inside noise of the vehicle will be produced by the vibrations transmitted via the upper control arms.

It is conceivable to minimize the inside noise produced by the vibrations transmitted by the upper control arms in the above mentioned conventional mounting structure by pivotably connecting the rearward ends of the upper control arms to the axle housing at positions as close as possible to the outer ends thereof. In such a case, however, it is necessary to dispose the inner side members to which the forward ends of the upper control arms are pivoted, in the vicinity of the outer side members. This brings about various difficulties, for instance, such that the work for attaching the outer and inner side members becomes difficult. Thus, this system does not provide a satisfactory solution to the problem.

SUMMARY OF THE INVENTION

The object of the present invention is to provide a structure for effectively mounting a pair of upper control arms on a floor panel of a monocoque vehicle body thereby minimizing the production of an inside noise, in a four link suspension system for resiliently supporting a rigid axle housing against said body.

The present invention is characterized in that in a four link suspension system comprising a pair of upper control arms and a pair of lower control arms disposed between a rigid axle housing and a monocoque vehicle body having a floor panel and adapted to swingably connect the axle housing to the body, a pair of side members are secured to both sides of the floor panel, a cross member is spanned between the side members with a distance from the floor panel, and said upper control arms are pivotally connected to the cross member.

According to the present invention, the vibrations of the rigid axle housing transmitted to the upper control arms are transmitted to the side members secured to the floor panel, via the cross member spaced from the floor panel, i.e. without being transmitted directly to the side members secured to the floor panel as in the conventional system. Accordingly, the floor panel will not so vigorously be vibrated by the vibrations as to produce an inside noise of the vehicle. Further, the brackets for the upper control arms may be secured at an optional position on the cross member, and accordingly it is possible to pivotally connect the upper control arms to the rigid axle housing at positions where the vibrations are minimal. Thus, the input of the vibrations transmitted to the floor panel via the upper control arms can thereby be further reduced, and accordingly, it is possible to effectively reduce the inside noise.

BRIEF DESCRIPTION OF THE DRAWINGS

FIG. 6 is a graph showing the inside noise characteristics according to the present invention.

DETAILED DESCRIPTION OF THE INVENTION

Figure 1:
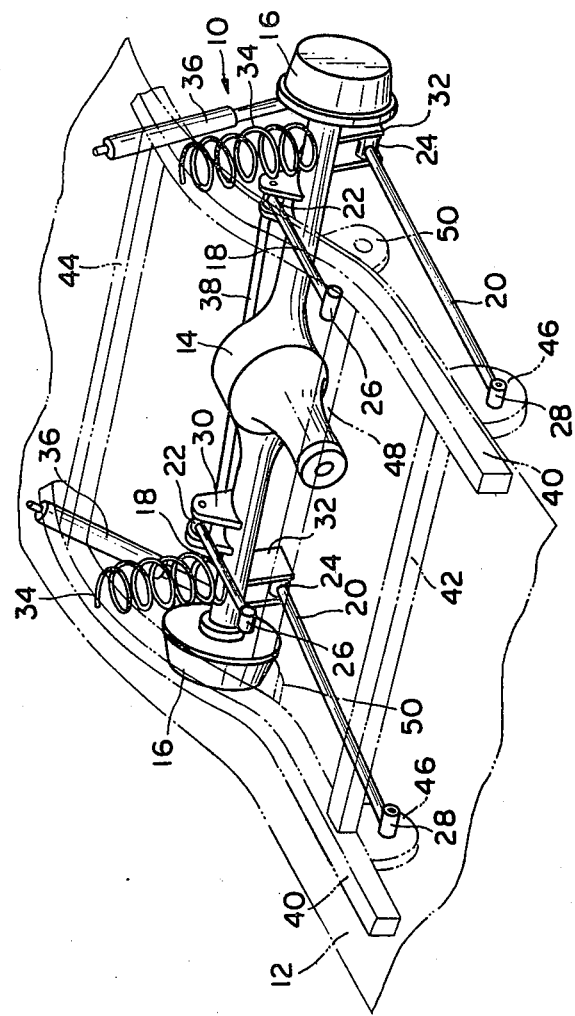
FIG. 1 is a perspective view diagrammatically illustrating a four link suspension system according to the present invention.

As shown in FIG. 1, the four link suspension system 10 according to the present invention, flexibly or resiliently supports a rigid axle housing 14 against a monocoque vehicle body having a floor panel 12.

The rigid axle housing 14 encases a rear axle shaft (not shown) extending in a transverse direction of the body, and at each end of the axle shaft protruded from the housing 14, there are secured a hub for attachment of a driving wheel (not shown) and a brake drum 16.

The suspension system 10 includes a pair of upper control arms 18 extending in a longitudinal direction of the body with a distance from each other in a transverse direction of the body, and a pair of lower control arms 20 located outside of the upper control arms and extending in a longitudinal direction of the body with a distance from each other in a transverse direction of the body.

At the rearward ends of the control arms 18 and 20, there are provided eye portions 22 and 24 which are conventionally well known as means for the connection with the axle housing, and at the forward ends of the control arms 18 and 20, there are provided eye portions 26 and 28 which are conventionally well known as means for the connection with the floor panel of the body.

On the upper side of the axle housing 14, there are provided a pair of upper brackets 30 of a U-shape to receive the eye portions 22 of the upper control arms 18. Inserted in the eye portion 22, are a conventionally well known cylindrical elastic member for damping vibrations and pivot pin extending through the elastic member, which are not illustrated in the drawings, and both ends of the pivot pin are supported by the bracket 30. Thus, each upper control arm 18 is pivotally connected at its rearward end to the axle housing 14, in the same manner as in the conventional system.

A pair of lower brackets 32 of an inverted U-shape are provided on the lower side of the axle housing 14 at positions outside of the upper brackets 30 and in the vicinity of the outer ends of the axle housing. In the eye portion 24 of the lower control arm 20, there are inserted a conventional well known cylindrical elastic member and pivot pin which are similar to those provided in the eye portion 22, and both ends of the pivot pin are supported by the bracket 32. Thus, each lower control arm 20 is pivotally connected at its rearward end to the axle housing 14.

Between the axle housing 14 and the body, there are provided a pair of suspension springs 34 made of coil spring and dampers 36, which are conventionally well known. Further, between the axle housing 14 and the body, a conventionally well known lateral rod 38 is provided which limits their relative lateral displacement i.e. the displacement in a transverse direction of the body.

On the floor panel 12 of the body, a pair of side members 40 are provided which support the forward ends of the control arms 18 and 20. The side members 40 are disposed at both sides of the floor panel 12, and each side member 40 extends in a longitudinal direction of the body at the rear portion of the body and along a kick-up portion provided on the floor panel to receive the wheel. Each side member 40 is fixed at its upper side to the lower side of the floor panel 12 by e.g. welding. Between the side members 40, there are provided reinforcing members 42 and 44 extending in a transverse direction of the body and secured at the respective ends to the respective side members 40. However, these reinforcing members may be omitted.

On the lower side of each side member 40, a conventionally well known bracket 46 is secured which supports the eye portion 28 of the lower control arm 20. In the eye portion 28, a cylindrical elastic member for damping the vibrations and a pivot pin, are inserted, which are similar to the conventional ones, and both ends of the pivot pin are supported by the bracket 46. Thus, the forward end of each lower control arm 20 is pivotally connected to the floor panel 12.

Figure 2:
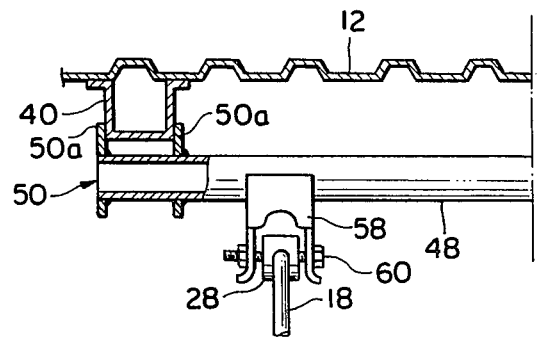
FIG. 2 is a cross sectional view illustrating the mounting structure of the suspension system shown in FIG. 1.

A bracket 50 for supporting the cross member 48 is provided on each side member at a position between the reinforcing members 42 and 44. As shown in FIG. 2, each bracket 50 comprises a pair of sheet members 50a extending downwardly from both sides of the side member 40, and each sheet member 50a is fixed to the side member 40 by e.g. welding. Each end of the cross member 48 extends through an opening provided in the sheet members 50a and fixed to the sheet members 50a at the edge portion of the opening by e.g. welding. Thus, the cross member 48 is supported by the side members 40 with a distance from the floor panel 12.

Figure 3:
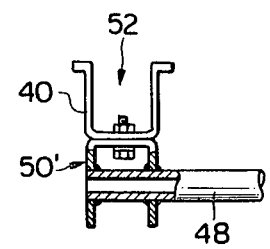
FIGS. 3 to 5 are similar to FIG. 2, but they illustrate other embodiments of the present invention.

Instead of using said bracket 50, it is possible, as shown in FIG. 3, to secure a bracket 50' of an inverted U-shape to the lower side of each side member 40 by a fastening means 52 comprising a bolt and a nut, and to fix the end of the cross member 48 to the bracket 50' in the same manner as described with reference to FIG. 2.

Figure 4:
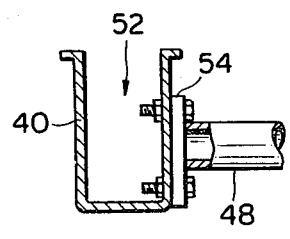

Likewise, as shown in FIG. 4, the arrangement may be such that a joint plate 54 is secured to each end of the cross member 48 so as to form a flange radially outwardly extending from the cross member, and the joint plate is secured to the inside face of the side member 40 by a fastening means 52 which is similar to the one mentioned above.

Figure 5:
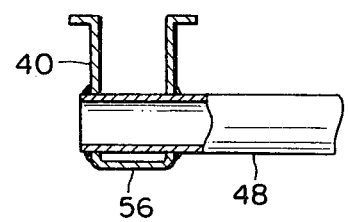

Further, it is also possible that, as shown in FIG. 5, at a lower portion of the side member 40, there is provided a bore 56 to receive the end of the cross member 48, and the side member 40 and the cross member are welded at the edge portion of the bore. In this manner, the cross member 48 can be secured to the side member 40 without using the bracket 50 or 50' or the joint plate 54.

As the cross member 48, a solid metal rod may be used. However, it is preferred to use a metal tube as shown in FIGS. 2 to 5 since such a tube is light in weight and strong.

Referring back to FIG. 2, a bracket 58 for supporting the eye portion 26 of the upper control arm 18 is secured to the cross member 48 at a position in the vicinity of the side member 40. Although not shown in the Figure, a conventionally well known cylindrical elastic member is inserted in the eye portion 26, and a pivot pin 60 extending through the elastic member is supported at its both ends by the bracket 58. Thus, each upper control arm 18 is connected at its forward end to the floor panel 12 via the cross member 48 spaced from the floor panel 12 and the side member 40 connecting the cross member to the floor panel 12.

In the suspension system 10 according to the present invention, the axle housing 14 is swingably connected to the body by the pair of upper control arms 18 and the pair of lower control arms 20 disposed between the body and the axle housing, in a similar manner as in the conventional suspension system. The vibrations from the axle housing 14 will be transmitted to the floor panel via the lower control arms 20 and the side members 40 connected to the arms. However, each lower control arm 20 is connected to the axle housing at a position in the vicinity of the end of the axle housing 14 where only a small deflecting vibration force in a longitudinal direction is exerted, as in the conventional system. Accordingly, the floor panel 12 will not so vigorously be vibrated as to produce a substantial inside noise, by the vibrations transmitted via the lower control arms 20 and acting in a longitudinal direction of the body.

Whereas, the upper control arms 18 located inside of the lower control arms 20, receive stronger longitudinal vibrations from the axle housing 14 than those exerted to the lower control arms 20.

However, the strong vibrations transmitted to the upper control arms 18 will not directly be transmitted to the side members 40 or the floor panel 12. Namely, the vibrations transmitted to the upper control arms 18 are transmitted via the cross member 48 spaced from the floor panel 12 and spanned between the side members 40 and via the side members, and finally reach the floor panel 12. During the travel via the cross member 48, the strong vibrations transmitted to the upper control arms and acting in a longitudinal direction of the body are partly absorbed and damped by e.g. deflection of the cross member. Thus, the floor panel 12 will not so vigorously be vibrated as to produce a substantial inside noise, by the vibrations transmitted via the upper control arms. Consequently, the inside noise due to the vibrations of the floor panel is reduced.

Further, in the suspension system 10 according to the present invention, the brackets 58 supporting the forward ends of the upper control arms 18 can be located in the vicinity of the side members 40. Namely, the connecting points of the upper control arms to the axle housing 14 can be brought closer to both ends of the axle housing as compared with the conventional case, by increasing the span between the upper control arms 18. Thus, the input of the vibrations from the axle housing to the upper control arms will be lowered, and accordingly the inside noise of the vehicle can thereby be further reduced effectively. It is particularly effective to connect the rearward ends of the upper control arms to the positions corresponding to the nodes of the vibration mode of the axle housing.

FIG. 6 is a graph showing a comparison of the inside noises in the suspension system according to the present invention and in the conventional suspension system. The vertical axis represents the sound pressure levels (dB) in the vehicles, and the horizontal axis represents the frequencies (Hz) of the secondary vibration mode produced in the axle housings by the rotation of the engines. The characteristic curve shown by the solid line represents the characteristics of the conventional suspension system. The characteristic curve shown by the broken line represents the characteristics of the suspension system of the present invention where the pair of upper control arms 18 are disposed with the same span as in the conventional suspension system. Further, the characteristic curve shown by the alternate long and short dash line represents the characteristics of the suspension system according to the present invention where the pair of upper control arms 18 are disposed with a span greater than that in the conventional suspension system and each upper control arm 18 is connected to a position corresponding to the node of the vibration mode of the axle housing.

It is apparent from the graph that according to the present invention, it is possible to substantially reduce the inside noise as compared with the conventional system even without changing the span between the upper control arms, and it is possible to further reduce the inside noise of from 120 Hz to 160 Hz by selecting the span.

The mounting structure described in the foregoing with respect to the upper control arms may be applied also to the pair of lower control arms, whereby a further reduction of the inside noise of the vehicle can be obtained.

According to the present invention, it is possible to prevent strong vibrations of the floor panel which is susceptible to vibrations and also to reduce the radiant sound due to the vibrations of the floor panel, and thus it is possible to improve the comfortableness in riding the vehicle by freeing the passenger from an unpleasant noise.

What is claimed is:

1. In a four link suspension system for a monocoque vehicle body having a floor panel, which comprises a pair of upper control arms and a pair of lower control arms disposed in a longitudinal direction of said body between a rigid axle housing encasing a transversely extending axle shaft and said body and adapted to swingably connect said axle housing to said body, a mounting structure for the upper control arms which comprises a pair of side members extending along both sides of said floor panel in a longitudinal direction of said body and secured to said floor panel, each of said side members having a downwardly extending bracket, and a cross member disposed between said side members with a distance from said floor panel and having ends fixedly secured to a respective one of said downwardly extending brackets, said cross member being provided with a pair of brackets with a distance from each other in a transverse direction of said body, said upper control arms having forward ends which are pivoted to the respective cross member brackets such that vibrations transmitted to said floor panel from said rigid axle housing through said upper control arms are reduced by deflection of said cross member.

2. The mounting structure as claimed in claim 1, wherein said cross member is made of a tubular member, for reducing weight and increasing the strength of said cross member.

3. The mounting structure as claimed in claim 1, wherein each of said side members is provided at a rear portion of said body along a kick-up portion formed on said body.

4. The mounting structure as claimed in claim 1, wherein a pair of reinforcing members extending in a transverse direction of said body with a distance from each other in a longitudinal direction of said body, are secured to the pair of said side members, and said cross member is secured to said side members at a position between said reinforcing members.

5. The mounting structure as claimed in claim 1, wherein each of said cross member brackets has an opening to receive an end of said cross member, and both ends of the cross member extend through the openings of the respective cross member brackets and secured to the respective brackets along the edge portions of the respective openings.

6. In a four link suspension system for a monocoque vehicle body having a floor panel, which comprises a pair of upper control arms and a pair of lower control arms disposed in a longitudinal direction of said body between a rigid axle housing encasing a transversely extending axle shaft and said body and adapted to swingably connect said axle housing to said body, a mounting structure for the upper control arms which comprises a pair of side members extending along both sides of said floor panel in a longitudinal direction of said body and secured to said floor panel, and a cross member disposed between said side members with a distance from said floor panel and fixedly secured at its both ends to the respective side members, said cross member being provided with a pair of brackets with a distance from each other in a transverse direction of said body, the forward ends of said upper control arms being pivoted to the respective brackets, the rear ends of said upper control arms being pivotably connected to the axle housing at positions corresponding to the nodes of the vibration mode of the axle housing, whereby the vibrations being transmitted to said floor panel from said rigid axle housing through said upper control arms are reduced by the deflection of said cross member.

7. In a four link suspension system as claimed in claim 6, wherein the rear ends of the lower control arms are pivotably connected to a position corresponding to the node of the vibration mode of the axle housing.

8. In a four link suspension system for a monocoque vehicle body having a floor panel, which comprises a pair of upper control arms and a pair of lower control arms disposed in a longitudinal direction of said body between a rigid axle housing encasing a transversely extending axle shaft and said body and adapted to swingably connect said axle housing to said body, a mounting structure for the upper control arms which comprises a pair of side members extending along both sides of said floor panel in a longitudinal direction of said body and secured to said floor panel, each of said side members having a bore, and a cross member disposed between said side members with a distance from said floor panel and having ends extending through the bores of said side members such that each end of the cross member is fixedly secured to a side member along the edge portion of the respective bore, said cross member being provided with a pair of brackets with a distance from each other in a transverse direction of said body, said upper control arms having forward ends pivoted to the respective brackets such that vibrations transmitted through said floor panel from said rigid axle housing through said upper control arms are reduced by deflection of said cross member.

9. In a four link suspension system for a monocoque vehicle body having a floor panel, which comprises a pair of upper control arms and a pair of lower control arms disposed in a longitudinal direction of said body between a rigid axle housing encasing a transversely extending axle shaft and said body and adapted to swingably connect said axle housing to said body, a mounting structure for the upper control arms which comprises a pair of side members extending along both sides of said floor panel in a longitudinal direction of said body and secured to said floor panel, and a cross member disposed between said side members with a distance from said floor panel and having ends which include a radially outward extending flange, each of which is fixedly secured to one of said side members, said cross member being provided with a pair of brackets with a distance from each other in a transverse direction of said body, said upper control arms having forward ends pivoted to the respective brackets such that vibrations transmitted through said floor panel from said rigid axle housing through said upper control arms are reduced by deflection of said cross member.

* * * * *